United States Patent [19]
Jain et al.

[11] Patent Number: 6,016,258
[45] Date of Patent: Jan. 18, 2000

[54] FULL BRIDGE DC-DC CONVERTERS

[75] Inventors: Praveen K. Jain, Pointe-Claire;
Harpreet Soin, Kanata, both of Canada

[73] Assignees: Nortel Networks Corporation;
Concordia University, both of
Montreal, Canada

[21] Appl. No.: 09/199,415

[22] Filed: Nov. 25, 1998

[30] Foreign Application Priority Data

Oct. 2, 1998 [CA] Canada .................................. 2249755

[51] Int. Cl.$^7$ ...................... H02M 3/335; H02M 7/5387
[52] U.S. Cl. .............................................. 363/17; 363/132
[58] Field of Search .................. 363/16, 17, 97,
363/98, 131, 132

[56] References Cited

U.S. PATENT DOCUMENTS

| | | | |
|---|---|---|---|
| 4,860,184 | 8/1989 | Tabizs et al. ............................... | 363/17 |
| 5,325,283 | 6/1994 | Farrington et al. ...................... | 363/132 |
| 5,657,212 | 8/1997 | Poon et al. ................................ | 363/17 |
| 5,781,419 | 7/1998 | Kutkut et al. ............................. | 393/17 |
| 5,808,879 | 9/1998 | Liu et al. .................................. | 363/17 |

*Primary Examiner*—Matthew Nguyen
*Attorney, Agent, or Firm*—R. John Haley

[57] ABSTRACT

A full bridge DC-DC converter has four switching devices in two switching legs each of two devices connected in series between two supply voltage terminals, junction points of the legs being connected to a primary winding of a transformer, from a secondary winding of which an output voltage of the converter is derived by rectifying and filtering. The output voltage is regulated by phase shift control of the switching devices. Zero voltage switching (ZVS) of the switching devices under potentially all converter load conditions is provided by snubber capacitors, connected in parallel with the switching devices, in conjunction with two inductors each connected between the junction point of a respective one of the switching legs and a point at a voltage midway between the voltages of the supply voltage terminals, which can be provided by a capacitive voltage divider between the supply voltage terminals. The inductors typically have different inductances, and one of the inductors may be omitted.

12 Claims, 5 Drawing Sheets

FULL BRIDGE DC-DC CONVERTERS

This invention relates to full bridge DC-DC converters, and is particularly concerned with zero voltage switching (ZVS) of such converters for increased efficiency, reduced power losses, and reduced electromagnetic interference (EMI). ZVS refers to so-called lossless or soft switching to turn on and to turn off a switching device at times when there is little or no voltage across the device, so that power losses due to the switching are relatively very small.

BACKGROUND OF THE INVENTION

It is known to provide a phase shift controlled full bridge DC-DC converter which comprises four switches, typically constituted by MOSFETs, arranged in a bridge with a DC supply connected to one diagonal of the bridge and a primary winding of a transformer connected to the other diagonal of the bridge. A DC output of the converter is provided via a full wave rectifier arrangement, for example comprising two diodes connected to a center tapped secondary winding of the transformer, and an output filter comprising a series inductor and a shunt capacitor.

It is also known in such a converter to provide an inductor in series with the primary winding of the transformer, and a snubber capacitor connected in parallel with each of the four switches, in order to provide ZVS of the switches when the converter operates with its full load. However, such an arrangement fails to ensure ZVS at reduced loads of the converter, and has other disadvantages such as requiring an increased inductance of the output filter inductor.

An object of this invention is to provide an improved full bridge DC-DC converter.

SUMMARY OF THE INVENTION

According to one aspect of this invention there is provided a DC converter comprising: a bridge having two switching legs, each comprising two controlled switching devices connected in series, each switching leg connected between two supply voltage terminals and having a junction point between its series-connected switching devices; a transformer having a primary winding and a secondary winding, the primary winding being coupled between the junction points of the switching legs; a rectifier and output filter circuit connected to the secondary winding for providing an output voltage of the converter; a snubber capacitor coupled in parallel with one of the switching devices in one of the switching legs; and an inductor coupled between the junction point of said one of the switching legs and a point for providing a voltage between voltages of the supply voltage terminals.

Another aspect of the invention provides a converter comprising a bridge arrangement of four switching devices, a primary winding of a transformer coupled to one diagonal of the bridge, voltage supply terminals coupled to another diagonal of the bridge, a secondary circuit coupled to and for deriving an output voltage from a secondary winding of the transformer, snubber capacitors connected each in parallel with a respective switching device, and an inductor coupled between a junction of the primary winding with the bridge and a point having a voltage between voltages of the supply voltage terminals for conducting current of each snubber capacitor connected to said junction to provide substantially zero voltage switching of the switching device in parallel with each such snubber capacitor.

Preferably there are four snubber capacitors, one in parallel with each switching device. The converter advantageously includes a second inductor coupled between a second junction of the primary winding with the bridge and a point having a voltage between voltages of the supply voltage terminals for conducting current of each snubber capacitor connected to said second junction to provide substantially zero voltage switching of the switching device in parallel with each such snubber capacitor.

The invention also provides a method of operating a full bridge DC-DC converter which comprises a bridge having two switching legs, each comprising two controlled switching devices connected in series, each switching leg connected between two supply voltage terminals and having a junction point between its series-connected switching devices, a primary winding of a transformer connected in between said junction points, a secondary circuit for deriving an output of the converter from a secondary winding of the transformer, and four snubber capacitors each connected in parallel with a respective one of the switching devices, comprising the steps of supplying substantially complementary control signals to the switching devices in one switching leg so that the switching devices conduct alternately with dead times therebetween, supplying relatively phase shifted substantially complementary control signals to the switching devices in the other switching leg so that the switching devices conduct alternately with dead times therebetween, and discharging the snubber capacitors of at least one of the switching legs during the respective dead times via an inductor coupled to a voltage point substantially midway between the voltages of the supply terminals.

Preferably this method further comprises the step of discharging the snubber capacitors of the other of the switching legs during the respective dead times via a second inductor coupled to a voltage point substantially midway between the voltages of the supply terminals.

The invention facilitates the provision of a full bridge DC-DC converter with ZVS under substantially all operating conditions, this being achieved in a simple manner with passive components which do not complicate the phase shift control of the switching devices.

BRIEF DESCRIPTION OF THE DRAWINGS

The invention will be further understood from the following description with reference to the accompanying drawings, in which.

DETAILED DESCRIPTION

Figure 1:
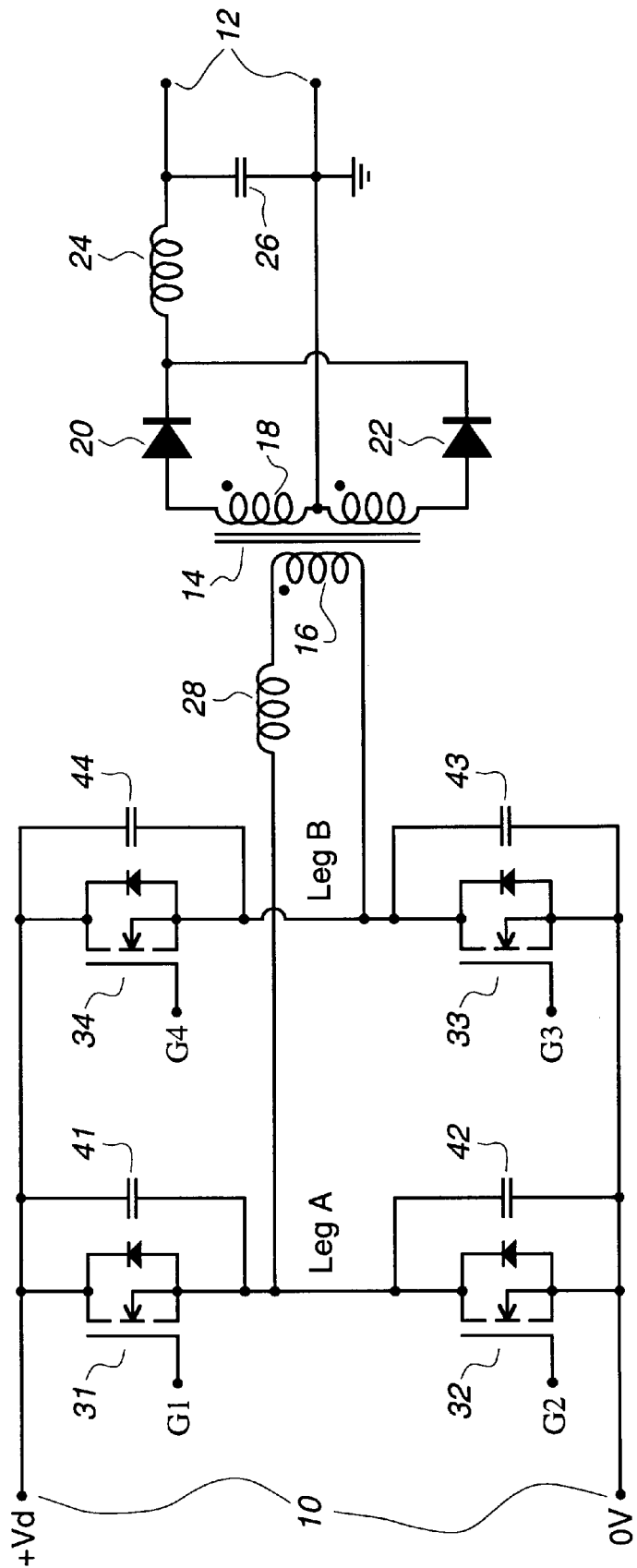
FIG. 1 schematically illustrates a known full bridge DC-DC converter.

Referring to FIG. 1, a known full bridge DC-DC converter is illustrated for providing from an input or source voltage +Vd, relative to a zero voltage of 0 V, supplied at DC supply terminals 10 a desired output voltage at DC output terminals 12 for supply to a load (not shown). A control circuit (not shown) serves to supply pulsed control signals G1 to G4 to the switching transistors of the converter for maintaining the output voltage at its desired level using phase shift control in known manner. As described further below, the signals G1 and G2 are generally complementary to one another at a desired switching frequency, and the signals G3 and G4 are relatively variably phase shifted from the signals G1 and G2 to provide the phase shift control. The switching frequency is typically desired to be high to permit the converter to be implemented using components of relatively small size, but is limited by switching losses of the converter.

The converter includes a transformer 14 having a primary winding 16 and a center tapped secondary winding 18 the senses of which are represented conventionally in FIG. 1 by dots adjacent to the windings. The center tap of the secondary winding 18 is connected to ground and to a grounded one of the output terminals 12, and the outer ends of the secondary winding are connected via respective diodes 20 and 22, constituting a full wave rectifier, and an output filter to the other of the output terminals 12. The output filter is an LC filter comprising a series output inductor 24 and a shunt output capacitor 26.

The primary winding 16 is connected in series with an inductor 28 between the junction points of two switching legs, referred to as leg A and leg B, of a full bridge arrangement of four switches 31 to 34 controlled by the control signals G1 to G4 respectively. Each of the switches is constituted by the drain-source path of an N-channel MOSFET, which is illustrated with its parasitic or body diode connected in parallel with the drain-source path, to the gate of which the respective control signal is supplied. Snubber capacitors 41 to 44 are also connected in parallel with the drain-source paths of the MOSFET switches 31 to 34. Switching leg A comprises the switches 31 and 32 connected in series between the +Vd and 0 V supply terminals 10, and switching leg B comprises the switches 34 and 33 connected in series between the +Vd and 0 V supply terminals 10, with the drains of the MOSFETs constituting the switches 31 and 34 being connected to the +Vd terminal and the sources of the MOSFETs constituting the switches 32 and 33 being connected to the 0 V terminal.

The snubber capacitors 41 to 44 are intended, in conjunction with the inductor 28, to provide for zero voltage switching (ZVS) of the switches. In other words, each snubber capacitor is intended to be fully discharged at each switching time of the respective switch, so that switching power losses are reduced. While this can be relatively closely approximated for the maximum or full load, connected to the output terminals 12, for which the converter is designed, at reduced and/or zero loads the snubber capacitors are not fully discharged at the turn-on times of the respective switches, and remaining energy stored in the snubber capacitors is dissipated in the switches at turn-on. This results in increased switching losses with reduced loads, lower efficiency, and higher EMI. In addition, the provision of the inductor 28 in series with the primary winding 16 results in an overlap in conduction of the diodes 20 and 22, and consequently reduced power transfer from the input to the output of the converter, and reduces the effective duty cycle of the converter, necessitating an increased inductance of the output inductor 24.

As recognized by the present inventors, the failure at reduced loads of the known converter of FIG. 1 to discharge the snubber capacitors completely by the turn-on times of the switches arises because with reduced loads the transformer primary winding current is also reduced to a level which is insufficient to discharge the snubber capacitors within the dead times provided by the control circuit.

Figure 2:
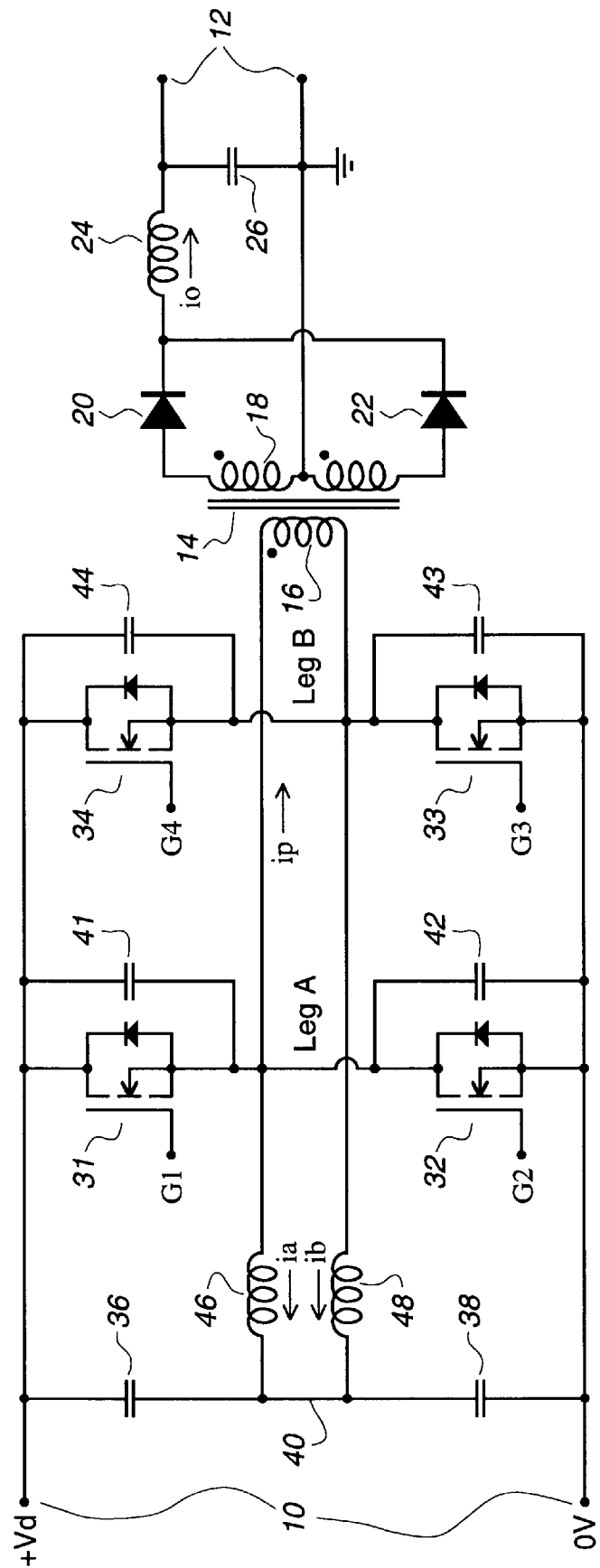
FIG. 2 schematically illustrates a full bridge DC-DC converter in accordance with an embodiment of this invention.

FIG. 2 schematically illustrates a full bridge DC-DC converter in accordance with an embodiment of this invention, the same references as in FIG. 1 being used to denote corresponding elements. The converter of FIG. 2 differs from that of FIG. 1 in particular in that the inductor 28 in series with the primary winding 16 of the transformer 14 is omitted, and in that the converter of FIG. 2 includes an auxiliary circuit comprising capacitors 36 and 38 and inductors 46 and 48. The capacitors 36 and 38 are connected in series with one another between the +Vd and 0 V supply terminals 10, so that they form a capacitive voltage divider; it is assumed here that they have equal capacitances which are sufficiently large that they provide at their junction 40 a substantially constant voltage +Vd/2 during steady state operation of the converter. It can be appreciated that this need not necessarily be the case, and that the junction 40 can alternatively be provided directly from a split voltage supply provided to the supply terminals 10 and this junction 40. The inductor 46 is connected between the junction point of the switching leg A and the junction 40, and the inductor 48 is connected between the junction point of the switching leg B and the junction 40. These inductors 46 and 48 are designed to cooperate with the snubber capacitors 41, 42 and 43, 44 respectively to provide zero voltage switching under all load conditions of the converter, as is further described below.

The operation of the converter of FIG. 2 is described in detail below with additional reference to FIG. 3 which illustrates, diagrammatically and not to scale, waveforms which can occur in operation of the converter. These waveforms comprise, for one cycle at the switching frequency in typical normal operation of the converter, the control signals G1 to G4, currents ia and ib of the inductors 46 and 48 respectively as shown in FIG. 2, a voltage vs produced across the secondary winding 18 of the transformer 14, a current io of the output inductor 24 as shown in FIG. 2 and having an average or DC component Io, currents iD1 and iD2 of the diodes 20 and 22 respectively, a current ip of the primary winding 16 of the transformer 14 as shown in FIG. 2, and voltage waveforms v1 to v4 (shown in dashed lines) and current waveforms i1 to i4 (shown in solid lines) for the switches 31 to 34 respectively. For descriptive purposes, the switching cycle is assumed to start at a time instant t0 and is subdivided into eight sequential operating intervals, numbered 1 to 8, as illustrated at time instants t1 to t8, where t8=t0+T and T is the switching frequency period. For clarity, zero voltage and current levels are indicated by light horizontal lines at the right-hand side of FIG. 3; in some cases these zero level lines are extended to the left to make the illustration more clear.

Figure 3:
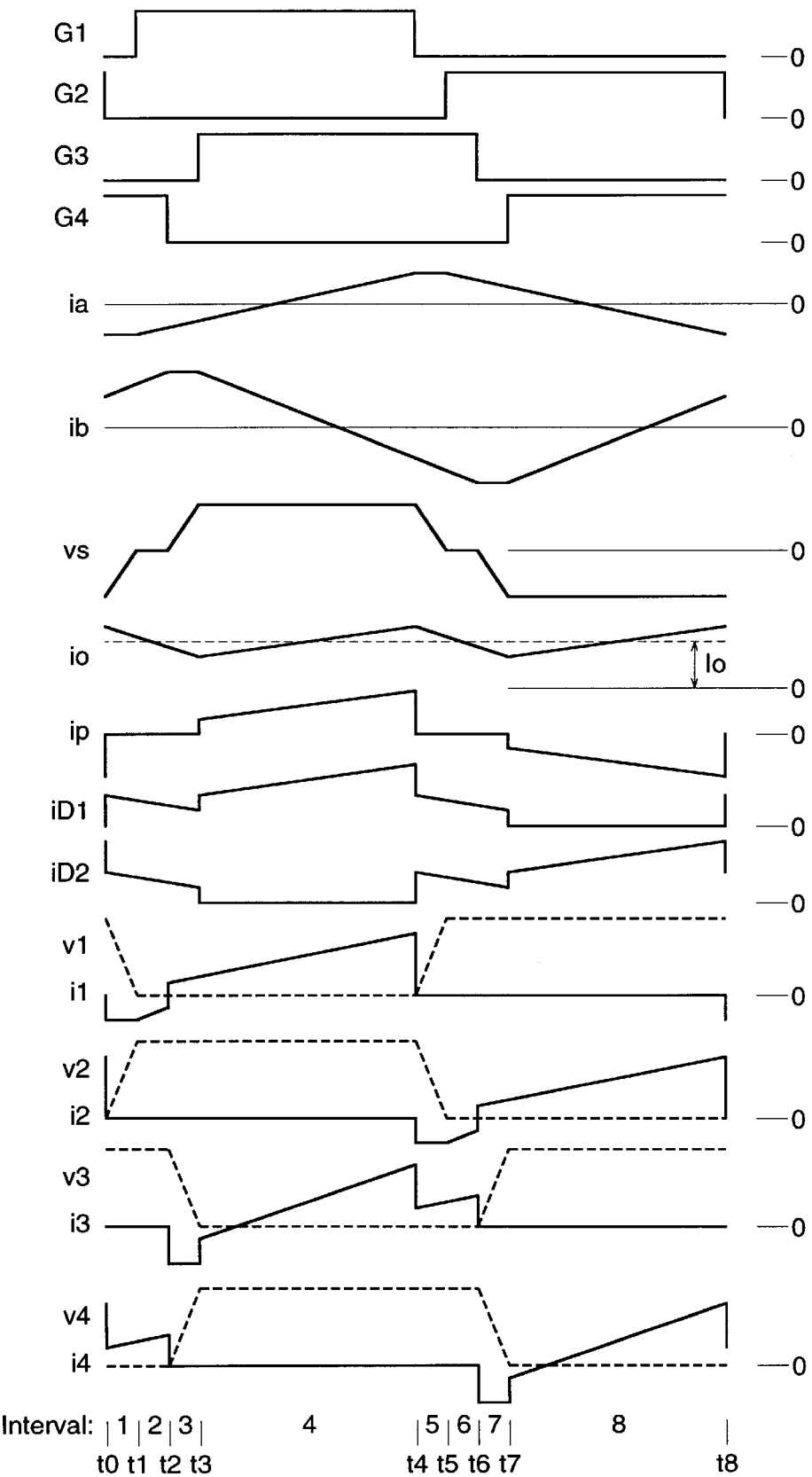
FIG. 3 illustrates operating waveforms of the converter of FIG. 2.

The generally complementary form of the control signals G1 and G2, and of the phase shifted control signals G3 and G4, can be seen from FIG. 3. There is a brief dead time td during the intervals 1 (t0 to t1) and 5 (t4 to t5) when both of the control signals G1 and G2 are zero; this ensures that the switches 31 and 32 in the switching leg A are not simultaneously conductive, thereby preventing a short circuit across the supply terminals 10. In this case td=t1−t0=t5−t4. Similarly, there is a brief dead time td in the intervals 3 (t2 to t3) and 7 (t6 to t7) when both control signals G3 and G4 are zero, to ensure that the switches 33 and 34 in the switching leg B are not simultaneously conductive. The control signal G3 is delayed in relation to the control signal G1 by a delay t3−t1, which corresponds to a phase shift and is varied by the control circuit in known manner for controlling the output voltage at the output terminals 12 as indicated above.

In the following description it is assumed for simplicity, although it need not be the case, that the snubber capacitors 41 and 42 in the switching leg A have equal capacitances Ca, and that the snubber capacitors 43 and 44 in the switching leg B have equal capacitances Cb. The following description relates to the operation of the converter substantially in each of the sequential intervals. For brevity, the switches 31 to 34 are referred to as being on (i.e. closed or conductive) or off (i.e. open or non-conductive), corresponding to the states of the MOSFETs which constitute these switches. The transformer 14 has a turns ratio of k:1+1, i.e. k turns of the primary winding for each turn of each half of the secondary winding.

Interval 1 (t0 to t1)

This interval commences at the time t0 and has a duration of td. Immediately before the time t0 (as shown in FIG. 3 just prior to the time t8) the switches 32 and 34 have been on so that the primary winding 16 has been supplied with a constant voltage −Vd (i.e. the supply voltage +Vd with reversed polarity). The diode 20 has been reverse biased and the diode 22 forward biased, so that the current io passed by the output inductor 24 has been reflected back to the primary circuit of the transformer 14 by the transformer coupling. The drain current of the switch 32 has reached a peak value I2 given by:

$$I2 = Ia + \frac{1}{k}\left(\frac{(Vd - kVo)Vo}{4VdLo}T + Io\right) \quad (1)$$

where Vo is the output voltage at the terminals 12, Lo is the inductance of the output inductor 24, and Ia is the peak value of the current ia of the inductor 46, given by:

$$Ia = \frac{Vd}{4La}\left(\frac{T}{2} - td\right) \quad (2)$$

where La is the inductance of the inductor 46.

At the time t0, the switch 32 is turned off by the control signal G2 becoming zero, and the switch 34 remains on. Consequently the current ia starts to charge the snubber capacitor 42 and to discharge the snubber capacitor 41. The presence of the capacitor 42 ensures lossless (ZVS) turn-off of the switch 32. The drain-source voltages v1 and v2 of the MOSFET switches 31 and 32 respectively are functions of time t given by:

$$v1(t) = Vd - \frac{1}{2Ca}I2(t - t0) \quad (3)$$

$$v2(t) = \frac{1}{2Ca}I2(t - t0) \quad (4)$$

Thus during the interval 1 the voltage across the switch 31 is reduced to zero and is clamped there by the body diode of this switch, and the voltage across the switch 32 is increased from zero at the switch turn-off time t0, reaching and being held at +Vd.

After v1 reaches zero, the primary winding 16 is supplied with a zero voltage because the switch 34 is still on. The diodes 20 and 22 start to share the output current io, as required by the output inductor 24, as in a known full bridge converter. Consequently, the primary winding current ip becomes zero and only the current ia flows in the switching leg A. Because the duration td of this interval is very short compared to the duty ratio of the switches, ia can be considered to be substantially constant during this interval.

In addition, the only current that flows in the closed switch 34 is the current ib of the inductor 48, given by:

$$ib(t) = \frac{Vd}{2Lb}\left(t - t0 - \frac{\theta T}{360}\right) + Ib \quad (5)$$

where θ is the switching phase shift angle in degrees and Ib is the peak value of this current, given by:

$$Ib = \frac{Vd}{4Lb}\left(\frac{T}{2} - td\right) \quad (6)$$

Interval 2 (t1 to t2)

At the time t1, the control signal G1 turns on the switch 31 in a lossless (ZVS) manner, because v1 is zero at this time as described above. Via the switch 31 the inductor 46 is supplied with the substantially constant (and relatively reversed) voltage of the capacitor 36, so that the inductor current ia increases linearly from its negative peak value Ia in accordance with:

$$ia(t) = \frac{Vd}{2La}(t - t1) - Ia \quad (7)$$

As both of the switches 31 and 34 are on, no current flows through the primary winding 16 (ip=0) and only the current ib flows through the switch 34 in accordance with equation (5) above. The duration of interval 2 is determined by the phase shift angle θ and the dead time td in accordance with:

$$t2 - t1 = \frac{\theta T}{360} - td \quad (8)$$

Interval 3 (t2 to t3)

At the time t2, the switch 34 is turned off by the control signal G4. Similarly to the description above for interval 1, on turn-off of the switch 34 the current ib, which is approximately at its positive peak Ib, discharges the snubber capacitor 43 and charges the snubber capacitor 44. The presence of the capacitor 44 ensures lossless (ZVS) turn-off of the switch 34. The drain-source voltages v3 and v4 of the MOSFET switches 33 and 34 respectively are functions of time t given by:

$$v3(t) = Vd - \frac{1}{2Cb}Ib(t - t2) \quad (9)$$

$$v4(t) = \frac{1}{2Cb}Ib(t - t2) \quad (10)$$

Thus during the interval 3 the voltage across the switch 33 is reduced to zero and is clamped there by the body diode of this switch, and the voltage across the switch 34 is increased from zero to reach and be held at +Vd.

After v3 reaches zero, the primary winding 16 is supplied with a constant voltage +Vd because the switch 31 is on. The diode 20 is forward biased so that its current iD1 is equal to the output inductor current io, and the diode 22 is reverse biased so that its current iD2 becomes zero. The output inductor current io is reflected back into the primary side of the transformer, so that the primary winding current ip becomes positive and is superimposed on the inductor currents ia and ib. To avoid charging the snubber capacitor 43 it is necessary for the combined current of ib and ip to be negative, so that the body diode of the switch 33 conducts this current and the voltage v3 across the switch 33 remains zero for ZVS of the switch 33 at the time t3 as described below.

The duration of interval 3 is the dead time td.

Interval 4 (t3 to t4)

At the time t3 the control signal G3 turns on the switch 33 in a lossless, ZVS manner because as described above the voltage v3 at this time is zero. Via the switch 33 the inductor 48 is supplied with the substantially constant (and relatively reversed) voltage of the capacitor 38, so that the inductor current ib decreases linearly from its positive peak value Ib in accordance with:

$$ib(t) = Ib - \frac{Vd}{2Lb}(t - t3) \quad (11)$$

During the interval 4, the switches 31 and 33 are both on, so that the drain currents i1 and i3 respectively of these switches are a combination of the primary winding current ip with the inductor currents ia and ib respectively, and are given by:

$$i1(t) = \frac{Vd}{2La}(t - t3) - Ia + \frac{1}{k}\left(\frac{Vd - kVo}{2kLo}(t - t3) + Io\right) \quad (12)$$

$$i3(t) = Ib - \frac{Vd}{2Lb}(t - t3) + \frac{1}{k}\left(\frac{Vd - kVo}{2kLo}(t - t3) + Io\right) \quad (13)$$

The duration of interval 4 is determined by the phase shift angle θ, or the duty ratio D, that is required to regulate the output voltage Vo, and is given by:

$$t4 - t3 = DT = \frac{kVoT}{2Vd} = \frac{T}{2} - td - \frac{\theta T}{360} \quad (14)$$

Intervals 5 to 8

The operation of the converter during these last four intervals of the cycle is complementary to the operation described above for the first four intervals of the cycle, as can be seen from FIG. 3.

Following the time t8, the operating sequence described above is repeated in subsequent cycles.

It can be appreciated from the above description that, to ensure ZVS turn-on of the switches 31 to 34, the current ia is combined with the current ip to discharge the snubber capacitors 41 and 42 in the switching leg A, whereas the current ib is required to overcome the current ip to discharge the snubber capacitors 43 and 44 in the switching leg B. Thus ib has a greater magnitude than ia; accordingly the inductance Lb of the inductor 48 is less than the inductance La of the inductor 46.

Thus it can be seen that an optimal arrangement of the converter of FIG. 2 is asymmetrical in that La>Lb.

At their turn-off times, the switches 31 and 32 in the switching leg A have been carrying the combined current ip and ia, whereas the switches 33 and 34 in the switching leg B have been carrying only the current ib (because ip is zero at these times), so that for ZVS turn-off the capacitance Ca of the snubber capacitors 41 and 42 can be greater than the capacitance Cb of the snubber capacitors 43 and 44.

From equations (1) to (3) above, it can be determined that a permitted maximum capacitance Ca to ensure that the capacitors 41 and 42 are completely discharged by the end of the dead time td is given by:

$$Ca = \frac{td}{2Vd}\left\{\frac{Vd}{4La}\left(\frac{T}{2} - td\right) + \frac{1}{k}\left(\frac{Vd - kVo}{4VdLo}T + Io\right)\right\} \quad (15)$$

This maximum capacitance value is dependent upon the input and output conditions as well as La and td, a lower output current and input voltage resulting in a lower maximum capacitance value. To ensure ZVS under all operating conditions, a capacitance value can be selected that is limited by the conditions of no load and minimum input voltage Vd.

From equations (6) and (9) above, a permitted maximum capacitance Cb is:

$$Cb = \frac{td}{8Lb}\left(\frac{T}{2} - td\right) \quad (16)$$

For given values of La and Lb, the discharging of the snubber capacitors will complete before the end of the dead time if smaller capacitance values are used, and ZVS can be ensured under all operating conditions in accordance with equations (15) and (16). This has been verified by simulation and experimental results.

Figure 4:
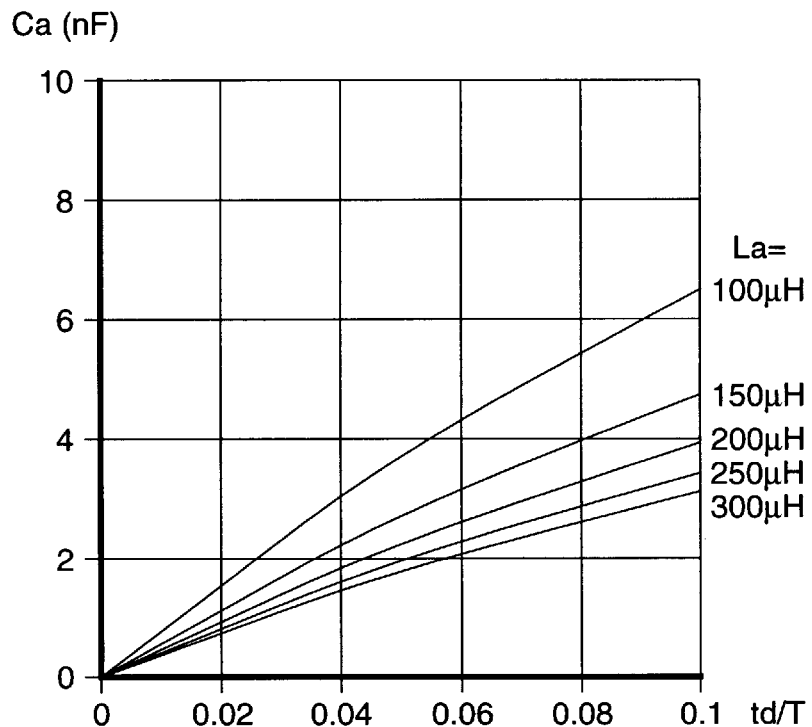
FIGS. 4 and 5 are graphs illustrating by way of example selection of snubber capacitance values for the converter of FIG. 2.
Figure 5:
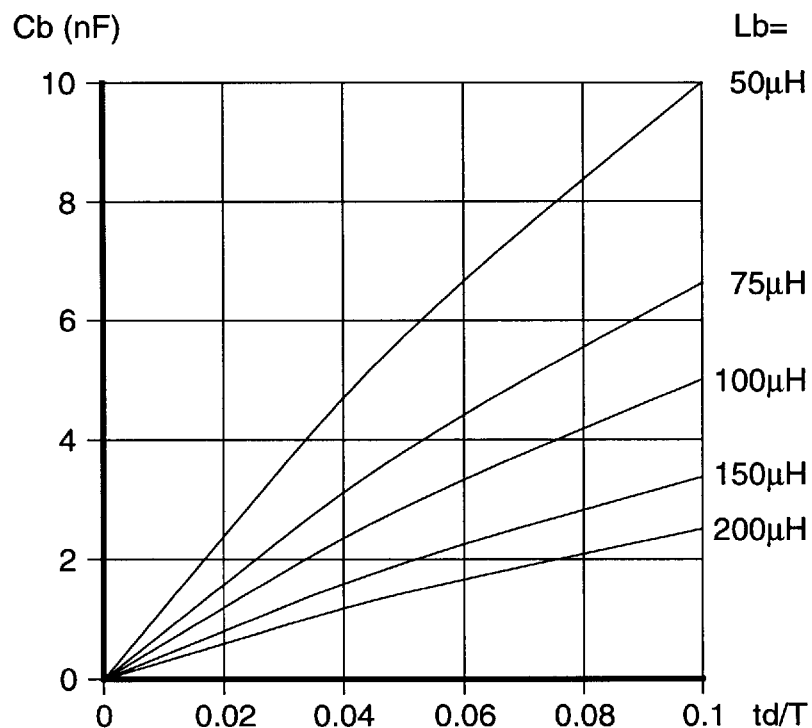

By way of example, FIG. 4 illustrates selection curves for the capacitance Ca of the snubber capacitors 41 and 42 as a function of the ratio td/T for different values of the inductance La of the inductor 46, and FIG. 5 illustrates selection curves for the capacitance Cb of the snubber capacitors 43 and 44 as a function of the ratio td/T for different values of the inductance Lb of the inductor 48. These selection curves relate to a converter for which T=10 μs, Vd=350 to 400 V, Vo=51 V, k=6, and Lo=20 μH; the capacitances of the capacitors 36 and 38 can typically be 1 μF.

Figure 6:
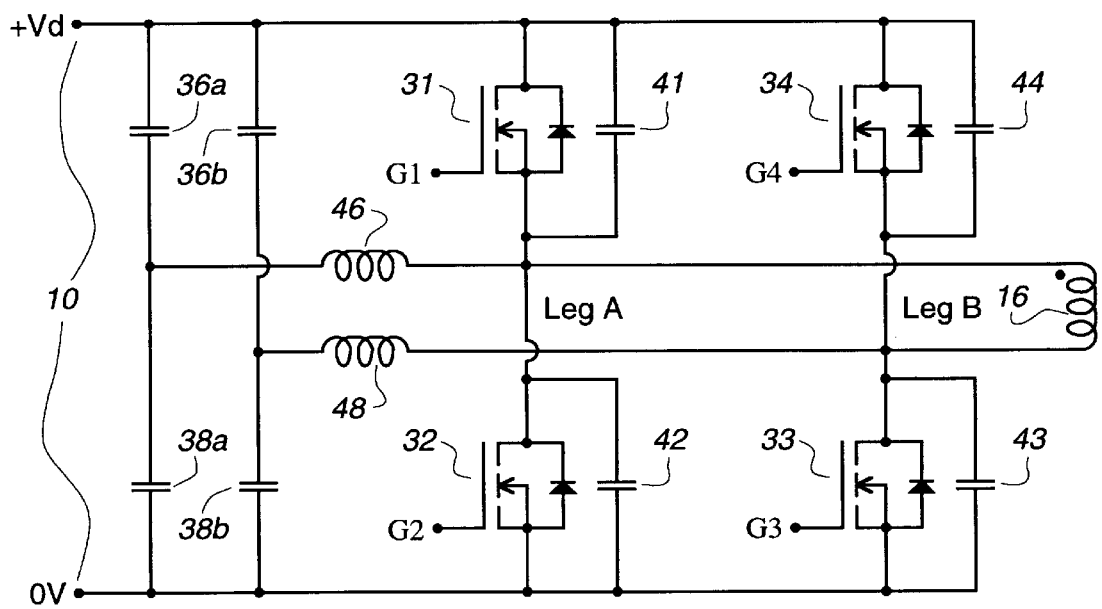
FIGS. 6 and 7 schematically illustrate parts of a full bridge DC-DC converter in accordance with alternative embodiments of the invention.

FIG. 6 illustrates an alternative arrangement of the primary side of the converter of FIG. 2, in which the voltage divider formed by the capacitors 36 and 38 of FIG. 2 is split into two separate voltage dividers, one comprising capacitors 36a and 38a to the junction of which the inductor 46 is connected, and the other comprising capacitors 36b and 38b to the junction of which the inductor 48 is connected. Otherwise this converter and its operation are substantially the same as described above.

Figure 7:
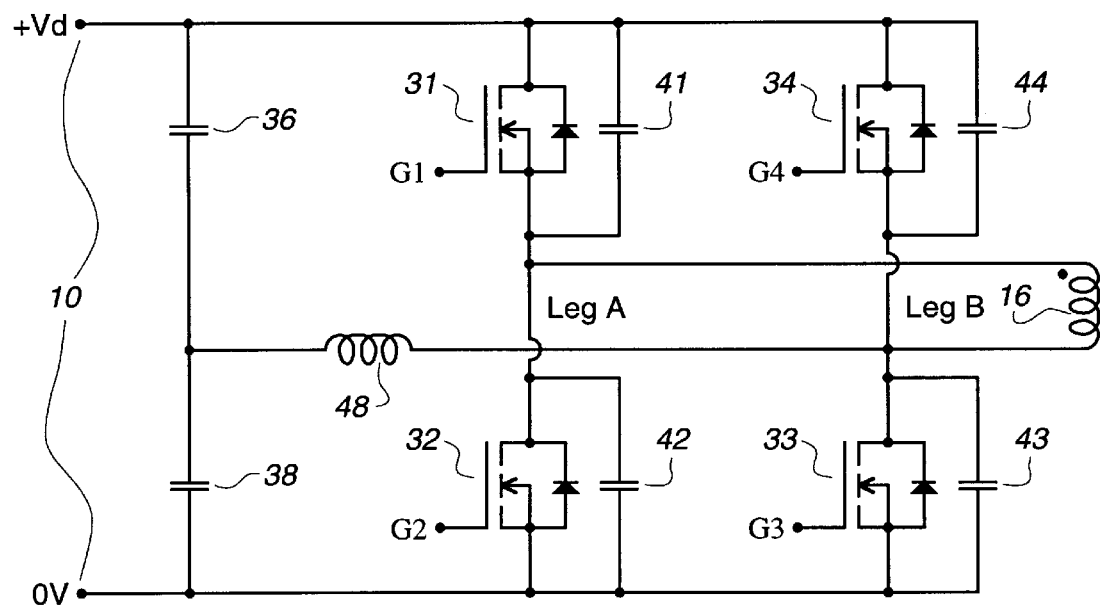

FIG. 7, again showing only the primary side of the converter, illustrates another alternative arrangement in which the inductor 46 of the converter of FIG. 2 is omitted. In the converter of FIG. 2, the commutation for the switching leg B between the switches 33 and 34 depends upon the primary current ip and the inductance Lb of the inductor 48. Conversely, the commutation for the switching leg A between the switches 31 and 32 depends upon the primary current ip and the inductance La of the inductor 46, but because of the coupling of the transformer 14 it also depends upon the inductance Lo of the output inductor 24 and the output current Io, as reflected back to the primary side via the transformer. As the energy stored in an inductor is proportional to the inductance multiplied by the square of the current, the effects of the secondary circuit are dominant in the latter case so that, except under substantially no load conditions, the inductor 46 may not be necessary to ensure that the snubber capacitors 41 and 42 are discharged completely within the respective dead times. Consequently, the inductor 46 can be omitted, as shown in FIG. 7. In this case a dummy load can optionally be provided to avoid substantially no load conditions.

Referring again to FIG. 3, it can be seen that the currents ia and ib which flow through the inductors 46 and 48 have substantially triangular waveforms, corresponding to the voltage across each inductor being a square wave which is independent of the duty cycle or ratio D of the converter.

Although as described above the secondary winding 18 is center tapped and the rectifier arrangement is constituted by the two diodes 20 and 22, it can be appreciated that other secondary circuits can be provided, for example a full wave rectifier arrangement using a diode bridge connected to a single untapped secondary winding.

Thus although particular embodiments of the invention have been described in detail, it can be appreciated that alternatives such as those mentioned above and numerous other changes, variations, and adaptations may be made without departing from the scope of the invention as defined in the claims.

What is claimed is:

1. A DC converter comprising:

a bridge having two switching legs, each comprising two controlled switching devices connected in series, each switching leg connected between two supply voltage terminals and having a junction point between its series-connected switching devices;

a transformer having a primary winding and a secondary winding, the primary winding being coupled between the junction points of the switching legs;

a rectifier and output filter circuit connected to the secondary winding for providing an output voltage of the converter;

four snubber capacitors each coupled in parallel with a respective one of the switching devices;

a first inductor coupled between the junction point of one of the switching legs and a point for providing a voltage between voltages of the supply voltage terminals; and a second inductor coupled between the junction point of the other of the switching legs and a point for providing a voltage between voltages of the supply voltage terminals.

2. A converter as claimed in claim 1 wherein the inductors have different inductances.

3. A converter as claimed in claim 1 wherein each said point providing a voltage between voltages of the supply voltage terminals provides a voltage mid-way between the voltages of the supply voltage terminals.

4. A converter as claimed in claim 3 and comprising at least one capacitive voltage divider connected between the two supply voltage terminals and having a junction point constituting at least one said point providing a voltage between voltages of the supply voltage terminals.

5. A converter as claimed in claim 1 wherein the secondary winding has a center tap and the rectifier and output filter circuit comprises an output inductor, two diodes each connected between a respective end of the secondary winding and one end of the output inductor for providing full wave rectification, and a capacitor coupled between another end of the output inductor and the center tap of the secondary winding.

6. A converter comprising a bridge arrangement of four switching devices, a primary winding of a transformer coupled to one diagonal of the bridge, voltage supply terminals coupled to another diagonal of the bridge, a secondary circuit coupled to and for deriving an output voltage from a secondary winding of the transformer, four snubber capacitors connected each in parallel with a respective switching device, a first inductor coupled between a junction of the primary winding with the bridge and a point having a voltage between voltages of the supply voltage terminals for conducting current of each snubber capacitor connected to said junction to provide substantially zero voltage switching of the switching device in parallel with each such snubber capacitor, and a second inductor coupled between a second junction of the primary winding with the bridge and a point having a voltage between voltages of the supply voltage terminals for conducting current of each snubber capacitor connected to said second junction to provide substantially zero voltage switching of the switching device in parallel with each such snubber capacitor.

7. A converter as claimed in claim 6 wherein the inductors have different inductances.

8. A converter as claimed in claim 6 wherein the secondary circuit comprises a full wave rectifying arrangement and an output filter comprising a series inductor and a shunt capacitor.

9. A converter as claimed in claim 6 wherein the four switching devices are arranged to be supplied with respective control signals for phase shift control to regulate the output voltage of the converter.

10. A converter as claimed in claim 6 wherein the switching devices comprise MOSFETs.

11. A method of operating a full bridge DC-DC converter which comprises a bridge having two switching legs, each comprising two controlled switching devices connected in series, each switching leg connected between two supply voltage terminals and having a junction point between its series-connected switching devices, a primary winding of a transformer connected in between said junction points, a secondary circuit for deriving an output of the converter from a secondary winding of the transformer, and four snubber capacitors each connected in parallel with a respective one of the switching devices, comprising the steps of supplying substantially complementary control signals to the switching devices in one switching leg so that the switching devices conduct alternately with dead times therebetween, supplying relatively phase shifted substantially complementary control signals to the switching devices in the other switching leg so that the switching devices conduct alternately with dead times therebetween, and discharging the snubber capacitors of each of the switching legs during the respective dead times via a respective one of two inductors each coupled to a voltage point substantially midway between the voltages of the supply terminals.

12. A method as claimed in claim 11 wherein current through each of the two inductors has a substantially triangular waveform.

* * * * *